(12) United States Patent
Agapi et al.

(10) Patent No.: US 7,747,445 B2
(45) Date of Patent: Jun. 29, 2010

(54) DISTINGUISHING AMONG DIFFERENT TYPES OF ABSTRACTIONS CONSISTING OF PLURALITY OF COMMANDS SPECIFIED BY PARTICULAR SEQUENCING AND OR TIMING OR NO TIMING AND SEQUENCING USING VOICE COMMANDS

(75) Inventors: Ciprian Agapi, Lake Worth, FL (US); Musaed A. Almutawa, Delray Beach, FL (US); Oscar J. Blass, Boynton Beach, FL (US); Brennan D. Monteiro, Boca Raton, FL (US); Roberto Vila, Hollywood, FL (US)

(73) Assignee: Nuance Communications, Inc., Burlington, MA (US)

( * ) Notice: Subject to any disclaimer, the term of this patent is extended or adjusted under 35 U.S.C. 154(b) by 611 days.

(21) Appl. No.: 11/457,057

(22) Filed: Jul. 12, 2006

(65) Prior Publication Data

US 2008/0015863 A1   Jan. 17, 2008

(51) Int. Cl.
  *G10L 15/22* (2006.01)
(52) U.S. Cl. .................................................. 704/275
(58) Field of Classification Search ................ 704/275, 704/252, 278; 455/563
  See application file for complete search history.

(56) References Cited

U.S. PATENT DOCUMENTS

| | | | |
|---|---|---|---|
| 5,619,554 A * | 4/1997 | Hogan et al. ............... | 379/88.1 |
| 5,761,641 A * | 6/1998 | Rozak et al. ............... | 704/275 |
| 5,966,704 A | 10/1999 | Furegati et al. | |
| 6,212,408 B1 * | 4/2001 | Son et al. .................... | 455/563 |
| 6,252,946 B1 | 6/2001 | Glowny et al. | |
| 6,369,821 B2 | 4/2002 | Merrill et al. | |
| 6,816,837 B1 * | 11/2004 | Davis ........................ | 704/275 |
| 6,937,706 B2 | 8/2005 | Bscheider et al. | |
| 2006/0190256 A1 * | 8/2006 | Stephanick et al. ......... | 704/252 |
| 2006/0206340 A1 * | 9/2006 | Silvera et al. ............... | 704/278 |

OTHER PUBLICATIONS

Arons, B., "Tools for Building Asynchronous Servers to Support Speech and Audio Applications," Symposium on User Interface Software and Technology, pp. 71-78, 1992.
Stifelman, L.J., et al., "VoiceNotes: A Speech Interface for a Hand-Held Voice Notetaker," Proceedings of InterCHI '93 Human Factors in Computing Systems ACM/SIGCHI, pp. 179-186, Apr. 24-29, 1993.
Sawhney, N., et al., "Nomadic Radio: Speech and Audio Interaction for Contextual Messaging in Nomadic Environments," ACM Transactions on Computer-Human Interaction, vol. 7, No. 3, pp. 353-383, 2000.

* cited by examiner

*Primary Examiner*—Talivaldis I Smits
*Assistant Examiner*—Farzad Kazeminezhad
(74) *Attorney, Agent, or Firm*—Wolf, Greenfield & Sacks, P.C.

(57) ABSTRACT

The present invention discloses a method for a voice-enabled computing environment. The method includes a step of receiving a series of voice commands related to an abstraction, wherein the voice command specifies an abstraction type. The method further includes responding to the voice command to replay the commands, executing at least one programmatic action related to the abstraction, where the programmatic action is executed demonstrating characteristics specific to the abstraction type associated with the voice command. The present method applies, but is not limited to, the execution of collections of commands that may have diverging timing characteristics.

20 Claims, 3 Drawing Sheets

DISTINGUISHING AMONG DIFFERENT TYPES OF ABSTRACTIONS CONSISTING OF PLURALITY OF COMMANDS SPECIFIED BY PARTICULAR SEQUENCING AND OR TIMING OR NO TIMING AND SEQUENCING USING VOICE COMMANDS

BACKGROUND

1. Field of the Invention

The present invention relates to the field of voice technologies, and, more particularly, to distinguishing among different types of abstractions using voice commands.

2. Description of the Related Art

Many different types of automated sequences or groupings of computing instructions exist including scripts, macros, and collections. These grouped actions are often used as an abstraction for a specific pattern or sequence of steps. Whenever a defined abstraction is detected by a computing device, an associated sequence of steps or set of programmatic instructions is automatically executed. Actions associated with particular abstractions can be user defined, where the abstraction is often a trigger having a logical relationship to the sequence of user defined actions.

For example, a user can define an abstraction "wake-up" consisting of a series of steps where a computing system (1) sounds an alarm, (2) starts to brew a cup of coffee, (3) starts a shower, and (4) prints a daily calendar for the user. In this example, the abstraction, "wake-up" is automatically performed at a previously established time. The steps of the abstraction can be timed so that the shower starts two minutes after the alarm, so that the coffee is brewed while the user is in the shower to ensure the coffee is hot, and so forth. A time dependent abstraction, such as "wake-up," is referred to as a script for purposes of the present invention.

Another type of abstraction includes a macro defined herein as a sequence of ordered steps, where the beginning of one step is contingent upon the completion of an earlier step. For example, a macro for "clean-clothes" can include placing clothes in a washer, adding detergent, starting a washer, waiting for the washer to finish, placing wet clothes in a dryer, and starting the dryer. In a macro, each subsequent step requires a completion of a preliminary step.

Still another type of abstraction includes a collection, defined herein as a sequence of asynchronous steps. Order and timing of actions in a collection are not significant. For example, a collection for "mass-fax" can result in multiple documents being faxed to multiple recipients. The mass-fax collection of steps can be performed by a community fax server as a background process whenever resources are available. An order of sent faxes and a timing of the sendings for the collection is not significant and can be handled in accordance with other workload and/or in accordance with an externally defined prioritization scheme.

Differentiation among different types of abstractions is an issue not currently addressed by conventional voice response systems. That is, no known voice response system permits a user to differentiate among a script, a macro, and/or a collection of steps using voice commands. This is a significant oversight related to voice-enabled computing environments that has resulted in abstractions being under utilized in these environments.

SUMMARY OF THE INVENTION

The present invention utilizes voice commands to disambiguate a type of abstraction in accordance with an embodiment of the inventive arrangements disclosed herein. More specifically, the present invention permits a user to define whether a user defined abstraction is to be recorded and/or executed as a script (time dependent sequence), a macro (sequentially ordered sequence), or a collection (asynchronous sequence). Different voice commands can be issued to a voice processing system to indicate a type of abstraction that is to be recorded, such as "record script," "record macro," or "record collection."

When a script is being recorded, the voice processing system can note relative timing aspects between steps so that the steps are repeated with the same relative delays as those existing when the script was recorded. The voice processing system can also prompt a user as to whether the recorded script is to be iteratively repeated (such as daily) at the same time that the recording was made or at another user established time. A common command, such as "playback NAME," with alternate form "at TIME playback NAME," can be used to schedule the user defined abstraction to run regardless of abstraction type.

When a macro is recorded, the system can note the relative order of the steps and use that order whenever the abstraction is executed in the future. Ordering and timing can be ignored when a recording is a collection. A common command, such as "stop recording," can be used to end the user defined abstraction regardless of abstraction type.

The present invention can be implemented in accordance with numerous aspects consistent with material presented herein. For example, one aspect of the present invention can include a method for a voice-enabled computing environment including a step of receiving a voice command related to an abstraction, wherein the voice command specifies an abstraction type. Responsive to the voice command, at least one programmatic action related to the abstraction can be performed, where the programmatic action is specific to the abstraction type specified by the voice command.

Another aspect of the present invention can include a voice-enabled computing system that includes a disambiguation engine. The disambiguation engine can differentiate between different types of abstractions based upon voice commands.

Still another aspect of the present invention can include a voice command for distinguishing between different abstraction types, where the voice command is a command understood by a voice-enabled computing system. The voice command can include an abstraction name and an abstraction type. The voice-enabled system can perform a programmatic action specific to the abstraction type responsive to receiving the voice command. The abstraction type can be one of a set of possible abstraction types comprising a script, a macro, and a collection. A script can be an abstraction including timing data for at least one included action. A macro can be an abstraction having sequentially ordered actions. A collection can be an abstraction with asynchronous actions.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
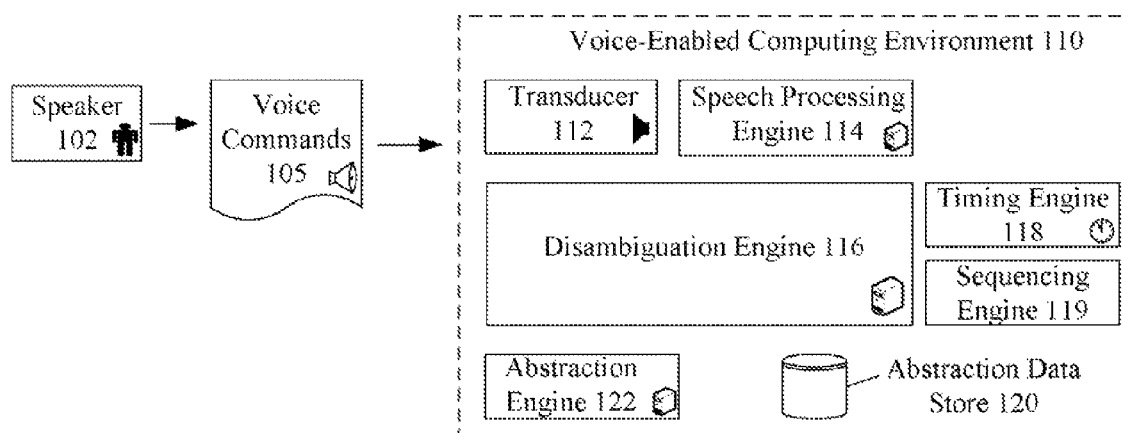
FIG. 1 is a schematic diagram of a system for distinguishing among different abstractions in accordance with an embodiment of the inventive arrangements disclosed here.
Figure 1:
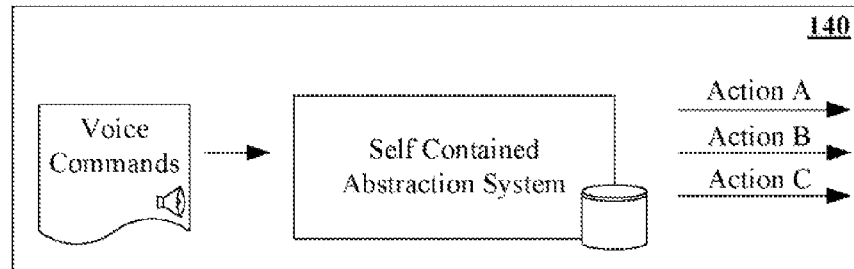
Figure 1:
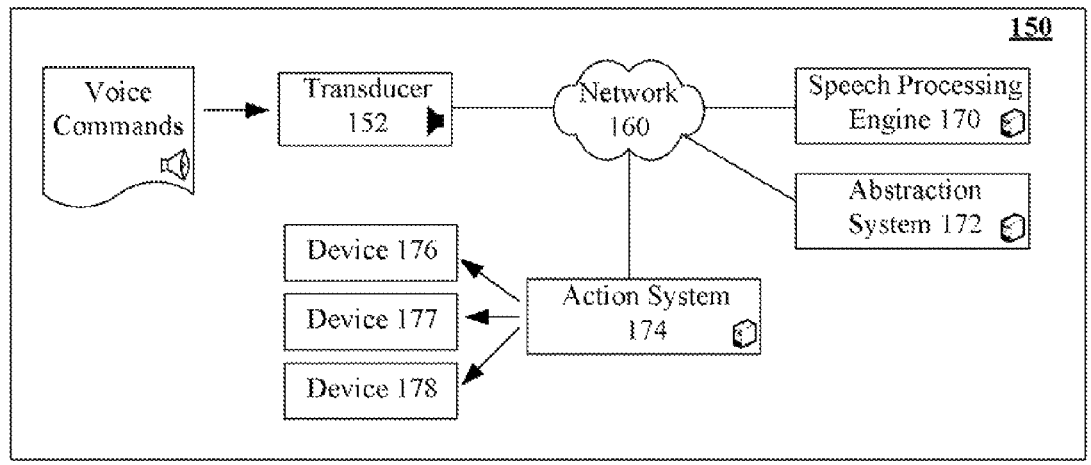

FIG. 1 is a schematic diagram of a system 100 for distinguishing among different abstractions in accordance with an embodiment of the inventive arrangements disclosed here. An abstraction is a set of actions or commands that are grouped. Abstractions are repetitively executed responsive to a single actuation command or event. An abstraction that includes timing information is considered a script. An abstraction having a relative ordering among included actions is considered a macro. An abstraction where included actions are able to be asynchronously executed is considered a collection.

In system 100, a speaker 102 can issue voice commands 105 to a voice-enabled computing environment 110. The speaker 102 can be any person or device capable of issuing speech, which includes previously recorded speech and speech issued from a remote location that is locally played via a speaker. The voice command 105 can cause a new abstraction of a user defined type to be recorded.

For example, the voice command 105 can be of a format "Record <TYPE> <NAME>," where TYPE is a type of abstraction (script, macro, collection, and the like) and NAME is a name that is to be associated with the abstraction. A set of one to N actions can follow the recordation initiation. A voice command, such as "Stop Recording" can finalize the newly recorded abstraction. Additionally, the voice command 105 can cause a previously stored abstraction to be executed. For example, a voice command 105 "wash clothes," "execute wash clothes," and/or "playback wash clothes" can cause each step associated with a "wash clothes" abstraction to be executed.

The voice-enabled computing environment 110 can be any computing environment capable of receiving and responding to voice commands. The voice-enabled computing environment 110 can be a voice-only environment as well as a multimodal environment having other input-output modalities than voice based ones. In environment 110, the voice commands 105 can be converted from sound to electrical signals using transducer 112. Speech processing engine 114 can convert the electronic signals to meaningful computing instructions. In one embodiment, the speech processing engine 114 can convert speech-to-text and can also convert text-to-speech when voice output is needed.

A disambiguation engine 116 can determine a type of abstraction that is being recorded and/or is to be executed. In one embodiment, the disambiguation engine 116 can determine a type of abstraction by parsing part of a user issued voice command 105. For example, the disambiguation engine 116 can discern that an abstraction initiated using a command "record script wash clothes" is an abstraction of a type "script." Similarly, "record macro" <name> can be used for abstractions of a macro type and "record collection" <name> can be used for abstractions of a collection type.

In one embodiment, the disambiguation engine 116 can include programmatic logic that infers (heuristically or algorithmically determined) a desired type of abstraction based upon programmatic logic instead of based upon a speaker 102 provided trigger word. For example, actions associated with a device, such as a sounding an alarm or triggering an alarm clock, where timing is generally an issue can be considered scripts by default using established programmatic logic. Actions that are generally performed in sequence, such as an action that includes washing and drying clothes, can generally be considered macros using programmatic logic. Actions that programmatic logic determines to be asynchronous can be considered collections by default. Abstraction types established by default can be overridden by explicit user selections.

The disambiguation engine 116 can be linked to a timing engine 118 and a sequencing engine 119. The timing engine 118 can record timing information that is used for script-type abstractions. The timing information can be relative or absolute. For example, the timing information of the timing engine 118 can cause actions of a script to be executed with the same relative pauses between actions (1 . . . N) that existed when a script was recorded. The timing engine 118 can also cause a script or actions contained therein to be executed at a particular time of day. For example, a wake-up script is likely to include timing information to be repetitively executed each weekday at an established time. Other timing parameters can be established by the timing engine 118 that are based upon detected actions, where timing counters are delayed until the action is detected. For example, a wake-up script can trigger a "start shower" action two minutes after a person leaves a bed responsive to a script actuated alarm. Dependent actions, such as re-sounding an alarm, increasing an alarm volume, and the like, can be situationally included in each script, each having action specific triggering and timing conditions.

The sequencing engine 119 can establish and manage dependencies between actions of an abstraction for abstractions of a macro type. That is, the sequencing engine 119 can make a completion of one action a prerequisite for beginning another action in a macro. In one embodiment, different branching actions can exist for a macro, where one of many different actions can be automatically triggered depending upon results of a different action. For example, if a first action has successful results, a second action for the macro can be triggered, otherwise a third action can be triggered that is conditioned upon an unsuccessful result of the first action. The sequence of actions (1 . . . N) can be based upon action dependencies that existed at a time a macro was recorded. Each recorded abstraction can be stored in abstraction data store 120 for future use.

An abstraction can include sub actions, which are themselves other abstractions. For example, an abstraction for clean clothes can include actions for "wash clothes" and "dry clothes." The various included abstractions within a parent abstraction can be of differing types. For example, an abstraction of a collection type can include one action that is an abstraction of a script type and another action that is an abstraction of a macro type.

Abstraction data store 120 can include user recorded abstractions, as well as system defined abstractions, and third-party provided ones. Regardless of abstraction type, abstraction engine 122 can cause any previously recorded abstraction to be executed. The abstraction engine 122 can initialize an abstraction responsive to a speaker 105 voice command, such as "execute <name>." The abstraction engine 122 can also automatically execute an abstraction responsive to a detection of an established triggering event, such as a timing event used for a "wake-up" script or an environmental event, such as a triggering of a security mechanism that initializes a security abstraction.

In one embodiment, the system 100 can be implemented as a self-contained system 140, where voice commands are received and actions result. All components necessary for speech-to-text converting of voice commands for determining a type of abstraction, and for executing actions for the abstractions, can be included in system 140.

In another embodiment, components of system 100 can be distributed across multiple and even remotely located computing devices, as shown in system 150. In system 150, voice commands can be received by transducer 152 and conveyed over network 160 to remotely located speech processing engine 170. The speech processing engine 170 can convey speech-to-text converted commands to remotely located abstraction system 172 via network 160. Abstraction system 172 can include disambiguation engine 116, timing engine 118, sequencing engine 119, abstraction data store 120, abstraction engine 122, and other components needed to record, store, and execute abstractions. A separate action system 174 can receive commands for each action that is to be executed as components of abstractions managed by abstraction system 172. The action system 174 can be linked to one or more devices 176, 177, and 178.

For instance, the action system 174 can be a "home automation" system that is linked to household devices, such as a washer, dryer, and the like, each of which can execute actions included in abstractions managed by abstraction system 172. In another example, action system 174 can be a "vehicle control" system and each device 176-178 can be controlled vehicle subsystems, such as vehicle locks, power windows, stereo volume control, and the like.

The abstraction system 172 shown in system 150 can be implemented as a fee-based service integrated to consumer electronic devices or computer systems via application program interfaces (APIs). For example, the abstraction system 172 can be implemented as a Web service that is available to network equipped computing devices and systems. Different collections of third-party developed abstraction packages can be selectively purchased as part of the Web service. Equipment manufacturers, such as vehicle manufacturers and home appliance manufacturers, can provide open abstraction packages that are available via subscriptions to the abstraction system 172. Product compatibility with a standardized abstraction service can result in competitive advantages since the abstraction service can satisfy a consumer desire for integrated, centralized, and/or automated control of disparate electronic devices and computing systems.

Network 160 can include any hardware/software/and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can further include circuit-based communication components and mobile communication components, such as telephony switches, modems, cellular communication towers, and the like. Network 160 can include line based and/or wireless communication pathways.

Abstraction data store 120 can be a physical or virtual storage space configured to store digital information. Abstraction data store 120 can be physically implemented within any type of hardware including, but not limited to, a magnetic disk, an optical disk, a semiconductor memory, a digitally encoded plastic memory, a holographic memory, or any other recording medium. Abstraction data store 120 can be a stand-alone storage unit as well as a storage unit formed from a plurality of physical devices. Additionally, information can be stored within abstraction data store 120 in a variety of manners. For example, information can be stored within a database structure or can be stored within one or more files of a file storage system, where each file may or may not be indexed for information searching purposes. Further, abstraction data store 120 can utilize one or more encryption mechanisms to protect stored information from unauthorized access.

Figure 2:
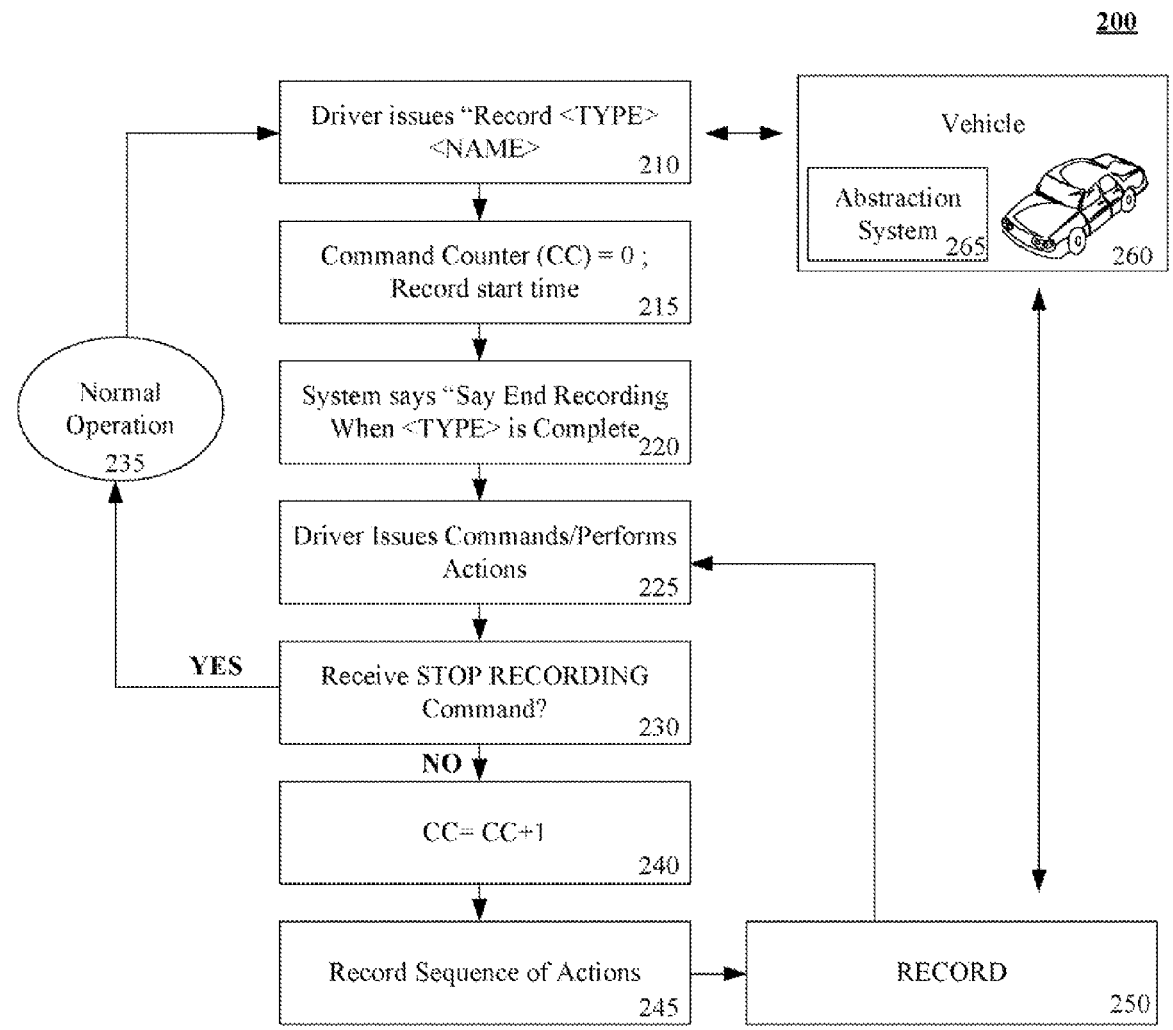
FIG. 2 shows an example of the abstraction disambiguation system in use in accordance with an embodiment of the inventive arrangements disclosed herein.

FIG. 2 shows an example 200 of the abstraction disambiguation system in use in accordance with an embodiment of the inventive arrangements disclosed herein. Example 200 can be performed in the context of a system 100, 140, and/or 150. Example 200 is for illustrative purposes only and the invention is not to be construed as limited in this regard.

Example 200 includes a voice-enabled abstraction system 265 for a vehicle 260. The abstraction system 265 can automate a set of actions that are commonly performed by a driver of the vehicle 260. For example, an abstraction "winter warm-up" can include a set of actions that are associated with warming up vehicle 260 in the winter, such as starting the engine, turning on the defroster, adjusting the seat for a particular driver, and the like.

A new abstraction can be initiated for vehicle 260, as shown in step 210, when a driver issues a recordation voice command. The command can take the form "Record <TYPE><NAME>" where <TYPE> is an abstraction type and <NAME> is a name for the abstraction. For example, a command "Record Steps Outgoing-Call" can initialize a new macro called Outgoing-Call, assuming "steps" is a previously established synonym or programmatic trigger indicating that the abstraction is of the macro type. A command "Record Script Warm-up" can initialize a new script for warming up a vehicle. A command "Record Actions Incoming-Call" can initialize a new collection for receiving an incoming phone call, assuming "Actions" is associated with the collection abstraction type for system 265.

In step 215, a command counter (CC) can be initiated, which can record timing between sets of actions, a start time, an end time, and other timing related data points for an abstraction. Abstractions of the script type will need this information when executed. In one embodiment, other types of abstractions can also record this information in order to give a driver an ability to retroactively change the abstraction type after an abstraction is recorded.

In step 220, system 265 can articulate a prompt of "Say End of Recording when Steps/Script/Actions are/is complete." In step 225, the driver can issue voice commands and/or perform in-vehicle actions. For example, the collection for "incoming-call" can be associated with a set of actions that include rolling the windows up and silencing the radio. Since this abstraction is a collection, the actions can occur asynchronously, so that the radio can be silenced before the windows are finished rolling up.

Once the collection recording is started, the user can specify actions for the collection through physical actions, such as by silencing the radio manually and by manually triggering a power window switch, and/or through voice commands. When system 265 is able to include physical actions as part of a set of abstraction actions, step 210 can place the system 265 in a "training" or "recording" mode. Most vehicle systems 265 will only permit a subset of non-critical physical actions to be recorded, such as window state, seat adjustments, radio volume, and the like. Critical vehicle actions, such as accelerate, brake, steer, and the like, can be excluded from a training mode for safety reasons.

In step 230, a check can be made for a stop recording command. A single command, such as "Stop Recording" can be used regardless of the type of abstraction being recorded. If the stop recording command is received, the new abstraction can be finalized and stored in a data store of system 265 for future use. Normal vehicle operations can then resume, as shown by step 235. If the recording is to continue, the command counter can be incremented in step 240. Additionally, a relative sequence of actions can be recorded in step 245, in the event that the abstraction is a macro type where action order is significant. In step 250, the recordation of the abstraction can continue, where new commands/actions (step 225) can be received. Throughout this process, abstraction data, such as abstraction start time, name, type, command counter, sequence, and the like, can be conveyed to or recorded within abstraction system 265, as shown in example 200 by arrows connecting step 210 and step 250 to vehicle 260.

Figure 3:
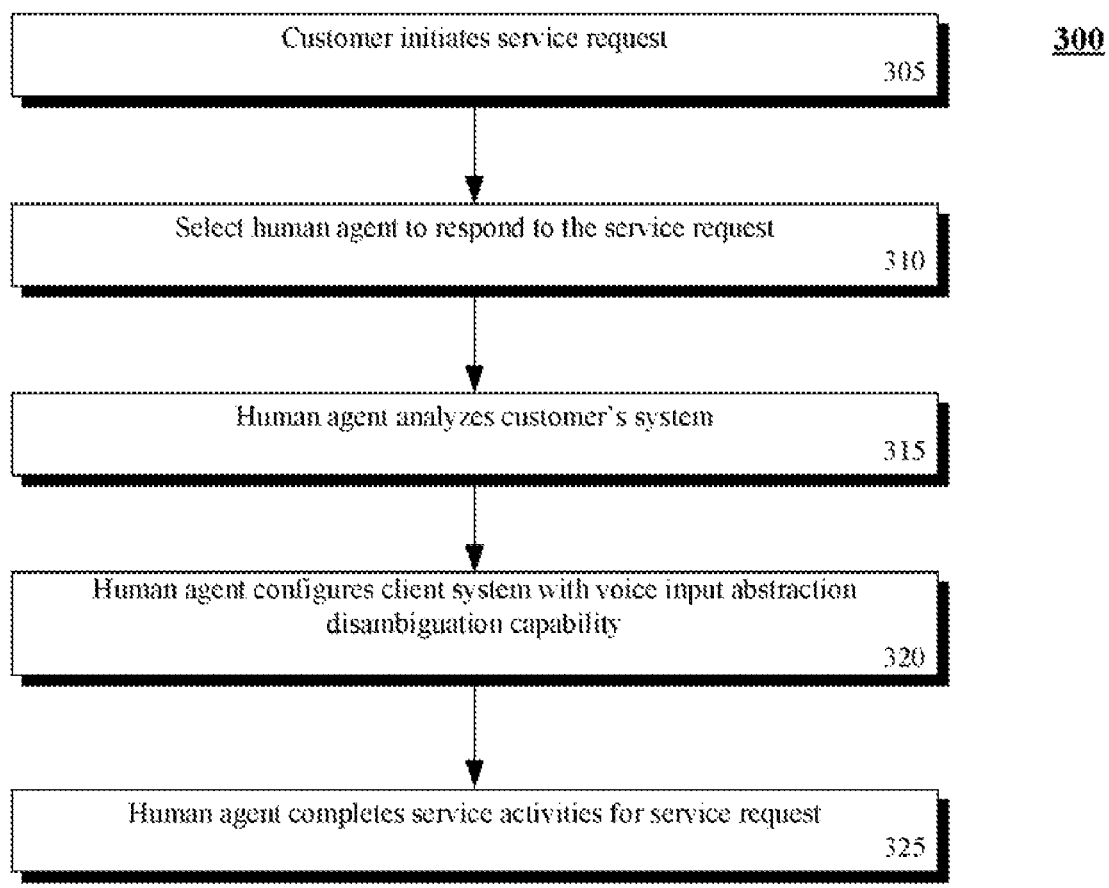
FIG. 3 is a flow chart of a method where a service agent can configure a system that includes voice based abstraction disambiguation capabilities in accordance with an embodiment of the inventive arrangements disclosed herein.

FIG. 3 is a flow chart of a method 300, where a service agent can configure a system that includes voice based abstraction disambiguation capabilities in accordance with an embodiment of the inventive arrangements disclosed herein. Method 300 can be preformed in the context of system 100, 140, and/or 150.

Method 300 can begin in step 305, when a customer initiates a service request. The service request can be a request for a service agent to enhance an existing customer voice processing system to disambiguate abstractions. The service request can also be a request to purchase and integrate an abstraction disambiguation service into a pre-existing system, which may or may not have stand-alone abstraction recordation and playback capabilities.

In step 310, a human agent can be selected to respond to the service request. In step 315, the human agent can analyze a customer's current system and can develop a solution. In step 320, the human agent can configure the client system with voice input abstraction disambiguation capabilities or can troubleshoot the same in an existing system. In step 325, the human agent can complete the service activities.

It should be noted that while the human agent may physically travel to a location local to adjust the customer's computer or application server, physical travel may be unnecessary. For example, the human agent can use a remote agent to remotely manipulate the customer's computer system.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer implemented method for a voice-enabled computing environment comprising:
   receiving a voice command related to an abstraction at at least one computer of the voice-enabled computing environment, wherein the voice command specifies an abstraction type;
   determining, from the voice command, which of a plurality of abstraction types supported by the voice-enabled computing environment is the abstraction type specified by the voice command, wherein each of the plurality of abstraction types is associated with an indication of whether any particular sequencing and/or timing is to be imposed; and
   responsive to the voice command, performing at least one programmatic action related to the abstraction, wherein the programmatic action is specific to the abstraction type specified by the voice command.

2. The method of claim 1, wherein the voice command is a record command for recording a new abstraction, wherein abstraction types able to be specified by the voice command comprise a script, a macro, and a collection, wherein a script is an abstraction including timing data for at least one included action that indicates an amount of time before the at least one included action is performed, wherein a macro is an abstraction having sequentially ordered actions, and wherein a collection is an abstraction in which no order or timing of included actions is defined.

3. The method of claim 1, wherein the abstraction type is a script, and wherein the recording step records a new script having a name specified in the voice command, said method step further comprising:
   automatically determining timing data for each action in a detected set of actions for the new script; and
   storing the timing data with the abstraction, wherein the set of actions are executed in accordance with the stored timing data whenever the stored abstraction is executed.

4. The method of claim 1, wherein the abstraction type is a macro, and wherein the recording step records a new macro having a name specified in the voice command, said method step further comprising:
   automatically determining an order for each action in a detected set of actions for the new macro; and
   storing data for the order with the abstraction, wherein the set of actions are executed in accordance with the stored order data whenever the stored abstraction is executed.

5. The method of claim 1, wherein the abstraction type is a collection, and wherein the recording step records a new collection having a name specified in the voice command, said method step further comprising:

automatically detecting a set of actions for the new collection, wherein the set of actions are executed asynchronously whenever the stored abstraction is executed.

6. The method of claim 1, wherein the steps of claim 1 are performed by at least one of a service agent and a computing device manipulated by the service agent, the steps being performed in response to a service request.

7. The method of claim 1, wherein said steps of claim 1 are performed by at least one machine in accordance with at least one computer program having a plurality of code sections that are executable by the at least one machine.

8. The method of claim 1, said recording step further comprising:
   initializing an abstraction recordation process responsive to the voice command;
   detecting a set of actions included in the abstraction;
   ascertaining a user triggered event to finalize the abstraction; and
   storing the abstraction for future use, wherein the abstraction is stored as the abstraction type specified by the voice command.

9. The method of claim 8, wherein the user triggered event is an event triggered by a user stop recording voice command, wherein the stop recording voice command is a phrase used for a plurality of different types of abstractions to end an abstraction recording.

10. The method of claim 8, wherein at least one action in the set of actions is a second abstraction having its own abstraction type.

11. The method of claim 8, wherein the initializing and storing steps are performed by a Web service.

12. The method of claim 8, wherein the initializing and storing steps are performed by software remotely located from a system which receives the voice command, which is communicatively linked to the system by a network.

13. A voice-enabled computing system comprising:
   a disambiguation engine configured to differentiate between different types of abstractions based upon voice commands, wherein the disambiguation engine supports a plurality of different abstraction types, wherein each of the plurality of different abstraction types is associated with an indication of whether any particular sequencing and/or timing is to be imposed.

14. The system of claim 13, wherein the plurality of abstraction types comprise scripts, macros, and collections, wherein a script is an abstraction including timing data that indicates an amount of time before the at least one included action is performed, wherein a macro is an abstraction having sequentially ordered actions, and wherein a collection is an abstraction in which no order or timing of included actions is defined.

15. The system of claim 13, wherein the at least one processor, executes the processor-executable instructions in the at least one computer-readable memory to perform (A), (B), and (C), in response to a request from a remotely located system.

16. The system of claim 13, wherein the computing system is used within a voice-only computing environment.

17. A computer system comprising:
   at least one computer-readable memory; and
   at least one processor, coupled to the at least one computer readable memory, that executes processor-executable instructions in the at least one computer-readable memory to:
   (A) receive a voice command to create an abstraction at at least one computer of the voice-enabled computing environment, wherein the voice command specifies an abstraction type;
   (B) determine, from the voice command, which of a set of possible abstraction types is the abstraction type specified by the voice command, wherein the set of possible abstraction types comprises a script, a macro, and a collection, wherein a script is an abstraction including timing data for at least one included action that indicates an amount of time before the at least one included action is performed, wherein a macro is an abstraction having sequentially ordered actions, and wherein a collection is an abstraction in which no order or timing of included actions is defined; and
   (C) responsive to the voice command, record a new abstraction of the abstraction type specified by the voice command.

18. The system of claim 17, wherein the voice command is part of a record abstraction command.

19. The system of claim 18, wherein the command is of a format RECORD <TYPE> <NAME>.

20. The system of claim 18, wherein a common command ends a recording of the abstraction regardless of abstraction type.

* * * * *